United States Patent
Noguchi et al.

(10) Patent No.: US 7,390,016 B2
(45) Date of Patent: Jun. 24, 2008

(54) CURTAIN AIRBAG DEVICE AND VEHICLE PROVIDED WITH THE SAME

(75) Inventors: Atsushi Noguchi, Moriyama (JP); Akifumi Takedomi, Higashioumi (JP); Noriyuki Kosugi, Higashioumi (JP)

(73) Assignee: Takata Corporation, Tokyo (JP)

( * ) Notice: Subject to any disclaimer, the term of this patent is extended or adjusted under 35 U.S.C. 154(b) by 171 days.

(21) Appl. No.: 11/206,120

(22) Filed: Aug. 18, 2005

(65) Prior Publication Data

US 2006/0061071 A1    Mar. 23, 2006

(30) Foreign Application Priority Data

Sep. 21, 2004    (JP)    ............... 2004-273613

(51) Int. Cl.
 *B60R 21/16* (2006.01)
 *B60R 21/20* (2006.01)
 *B60R 21/213* (2006.01)

(52) U.S. Cl. .................................. 280/730.2
(58) Field of Classification Search .......... 280/730.2; B60R 21/213
 See application file for complete search history.

(56) References Cited

U.S. PATENT DOCUMENTS

| | | | |
|---|---|---|---|
| 6,158,767 A | 12/2000 | Sinnhuber | |
| 6,530,594 B1 | 3/2003 | Nakajima et al. | |
| 6,644,687 B2 | 11/2003 | Saito et al. | |
| 6,830,262 B2 * | 12/2004 | Sonnenberg et al. | 280/730.2 |
| 7,163,232 B2 * | 1/2007 | Yokoyama et al. | 280/730.2 |
| 7,185,914 B2 * | 3/2007 | Recker et al. | 280/730.2 |
| 7,290,798 B2 * | 11/2007 | Mori et al. | 280/743.1 |
| 2002/0180190 A1 | 12/2002 | Tobe et al. | |
| 2003/0132620 A1 | 7/2003 | Kawasaki et al. | |
| 2004/0066022 A1 * | 4/2004 | Mori et al. | 280/730.1 |
| 2008/0018079 A1 * | 1/2008 | Mori et al. | 280/728.1 |

FOREIGN PATENT DOCUMENTS

| | | | |
|---|---|---|---|
| DE | 103 54 199 | | 7/2004 |
| EP | 1314618 A2 * | | 5/2003 |
| JP | 2000062562 A | | 2/2000 |
| JP | 2003104160 A | | 4/2003 |
| JP | 2003175792 A * | | 6/2003 |
| JP | 200458848 A * | | 2/2004 |
| JP | 2004-142530 A | | 5/2004 |
| JP | 2004182179 A * | | 7/2004 |

* cited by examiner

*Primary Examiner*—Kevin Hurley
*Assistant Examiner*—Joselynn Y. Sliteris
(74) *Attorney, Agent, or Firm*—Manabu Kanesaka

(57) ABSTRACT

A curtain airbag device includes a curtain airbag disposed along an upper side surface of a vehicle facing a cabin in a folded state to be able to expand downwardly along the side surface, and an inflator for inflating the curtain airbag. A guide airbag is arranged to expand substantially at the same time when the curtain airbag is expanded. The guide airbag guides the curtain airbag toward the cabin and/or regulates an expanding direction of the curtain airbag.

6 Claims, 5 Drawing Sheets

CURTAIN AIRBAG DEVICE AND VEHICLE PROVIDED WITH THE SAME

BACKGROUND OF THE INVENTION AND RELATED ART STATEMENT

The present invention relates to a curtain airbag for protecting a head of a vehicle occupant, and in particular, relates to a curtain airbag to be expanded along a window of a side door when a vehicle is involved in, for example, a side-on collision or rollover. Furthermore, the present invention relates to a vehicle provided with such a curtain airbag device.

As an airbag for protecting a head of a vehicle occupant, a curtain airbag device is disposed around a corner of a roof and a side surface inside a vehicle cabin for expanding along a window of a side door with gas through a gas inlet. When a vehicle with the curtain airbag device is involved in, for example, a side-on collision or rollover, the curtain airbag expands downwardly along a side surface (for example, a door or a pillar) inside the vehicle cabin so as to protect a head of an occupant and prevent the occupant from being thrown out of the vehicle when a window is open.

In Japanese Patent No. 3125729, a plate referred to as a jump base is provided under a folded curtain airbag for guiding the curtain airbag to expand in a certain direction, so that the curtain airbag is not caught in an upper end of a B pillar garnish.

Patent Document 1: Japanese Patent No. 3125729

In Japanese Patent No. 3125729, it is necessary to adjust a shape and a size of the jump base depending on a size of the vehicle body or a size and a shape of a B pillar garnish. Accordingly, it is necessary to design and produce the jump base for each type of vehicle.

In view of the problems described above, an object of the present invention is to provide a curtain airbag device attachable to a vehicle regardless of a size thereof or a size and a shape of a center pillar garnish.

Further objects and advantages of the invention will be apparent from the following description of the invention.

SUMMARY OF THE INVENTION

In order to attain the objects described above, according to a first aspect of the present invention, a curtain airbag device includes a curtain airbag disposed along an upper side surface of a vehicle facing a cabin in a folded state and being capable of expanding downwardly along the side surface; an inflator for inflating the curtain airbag; and a guide airbag to be expanded substantially at the same time when the curtain airbag is expanded for guiding the curtain airbag toward the cabin and/or regulating an expanding direction of the curtain airbag.

According to a second aspect of the present invention, in the curtain airbag device in the first aspect, the guide airbag is disposed between the side surface of the vehicle and the folded body of the curtain airbag.

According to a third aspect of the present invention, in the curtain airbag device in the first aspect, the guide airbag is disposed under the folded curtain airbag.

According to a fourth aspect of the present invention, in the curtain airbag device in one of the second and third aspects, the guide airbag expands so as to displace the curtain airbag toward the cabin over an upper end of a center pillar garnish facing the cabin.

According to a fifth aspect of the present invention, in the curtain airbag device in the first aspect, the guide airbag is disposed along a side of the folded curtain airbag facing the cabin and/or along the side and a top of the folded curtain airbag.

According to a sixth aspect of the present invention, in the curtain airbag device in the first aspect, the guide airbag is disposed between the side surface of the vehicle and the folded curtain airbag in an upper area of a center pillar, and is disposed along a side of the folded curtain airbag facing the cabin and/or along the side and the top of the folded curtain airbag in the upper area of a side door or a window.

According to a seventh aspect of the present invention, in the curtain airbag device in the first aspect, the guide airbag is disposed between the side surface of the vehicle and the folded curtain airbag and under the folded curtain airbag in the upper area of a center pillar, and is disposed along a side of the folded curtain airbag facing the cabin and/or along the side and the top of the folded curtain airbag in the upper area of a side door or a window.

According to an eighth aspect of the present invention, in the curtain airbag device in one of the sixth and seventh aspects, the guide airbag expands so as to displace the curtain airbag toward the cabin over the upper end of a center pillar garnish facing the cabin in the upper area of the center pillar.

According to a ninth aspect of the present invention, in the curtain airbag device in one of the first to eighth aspects, the guide airbag has a volume smaller than that of the curtain airbag.

According to a tenth aspect of the present invention, in the curtain airbag device in one of the first to ninth aspects, the inflator is connected to both the guide airbag and the curtain airbag so as to supply gas to both airbags.

A vehicle according to the present invention includes the curtain airbag device according to the present invention.

According to the curtain airbag and the vehicle of the present invention, the inflator starts operating upon a side-on collision or rollover of the vehicle, and the curtain airbag expands along the side surface (for example, a window opening and a center pillar) inside the vehicle cabin. The guide airbag expands substantially at the same time as the expansion of the curtain airbag so as to regulate the expanding direction of the curtain airbag or displace the curtain airbag toward the cabin, so that the center pillar garnish does not interfere with the curtain airbag. As a result, the curtain airbag expands very smoothly.

When the guide airbag is disposed between the side surface of the vehicle and the folded curtain airbag, the curtain airbag moves quickly toward the cabin, and the interference of the center pillar garnish can be prevented. Also, when the guide airbag is disposed under the folded curtain airbag, the curtain airbag is pushed by the guide airbag so as to move toward the cabin, and the interference of the center pillar garnish can be prevented. In these cases, the curtain airbag is displaced toward the cabin over the upper end of the center pillar garnish facing the cabin, and the interference of the center pillar garnish with the curtain airbag can be reliably prevented.

The guide airbag may be disposed along the side of the curtain airbag facing the cabin, or along the side and the top of the curtain airbag. In this case, the curtain airbag quickly expands downwardly.

The guide airbag may be disposed between the side surface of the vehicle and the folded curtain airbag in the upper area of the center pillar, and may be disposed along the side of the folded curtain airbag facing the cabin and/or along the side and the top of the folded curtain airbag in the upper area of the side door or the window.

When the guide airbag is disposed as described above, the curtain airbag is pushed by the guide airbag inflated adjacent to the side surface of the vehicle and moves toward the cabin in the upper area of the center pillar. Thus, the interference of the center pillar garnish can be prevented. In addition, in the upper area of the side door or the window, the curtain airbag is guided by the guide airbag inflated along the top or the side facing the cabin of the curtain airbag, and quickly expands downwardly.

Furthermore, when the guide airbag extends from between the folded curtain airbag and the side surface of the vehicle to the lower portion of the folded curtain airbag in the upper area of the center pillar, the curtain airbag moves smoothly to the cabin, and the interference of the center pillar garnish can be reliably prevented.

In these cases, the curtain airbag is displaced toward the cabin over the upper end of the center pillar garnish facing the cabin in the upper area of the center pillar. Thus, the interference of the center pillar garnish with the curtain airbag can be reliably prevented, and the curtain airbag expands quickly along the side surface of the vehicle.

According to the present invention, the volume of the guide airbag is smaller than that of the curtain airbag. Thus, the guide airbag finishes expanding faster than the curtain airbag.

According to the present invention, a common inflator preferably supplies gas to both the guide airbag and the curtain airbag, thereby reducing weight and cost of parts such as inflators and assembling.

DETAILED DESCRIPTION OF PREFERRED EMBODIMENTS

Hereunder, embodiments of the present invention will be described with reference to the accompanying drawings.

Figure 1:
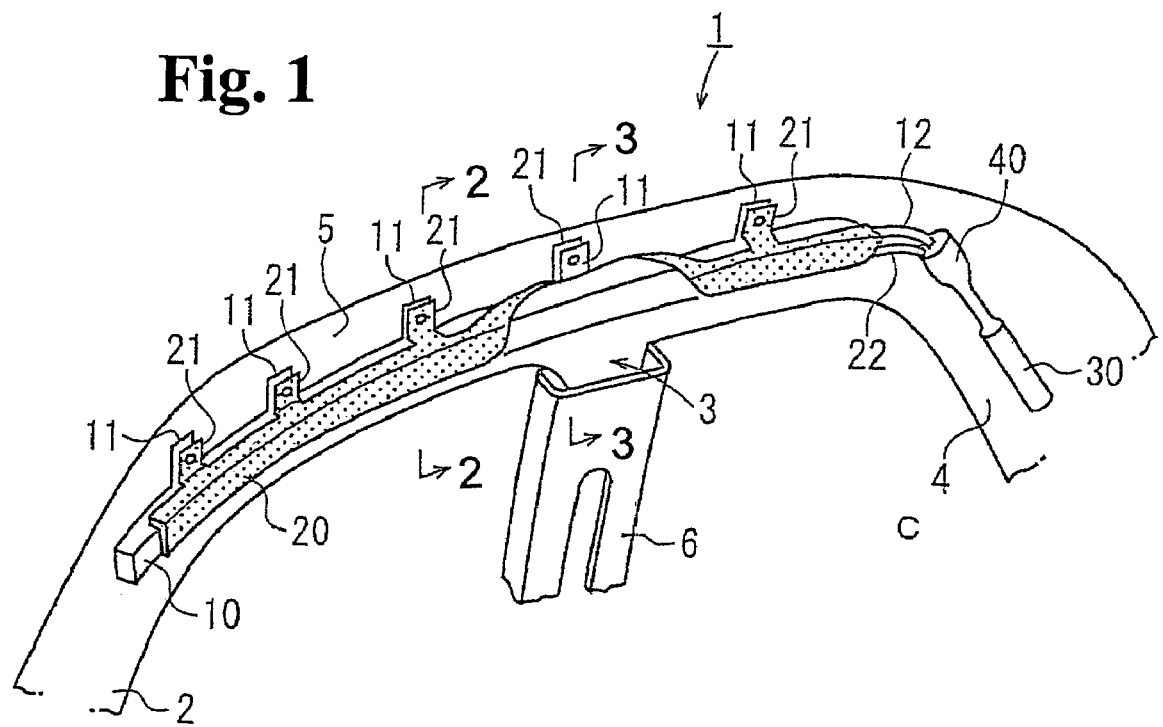
FIG. 1 is a perspective view inside a vehicle including a curtain airbag device according to an embodiment of the present invention.
Figure 2:
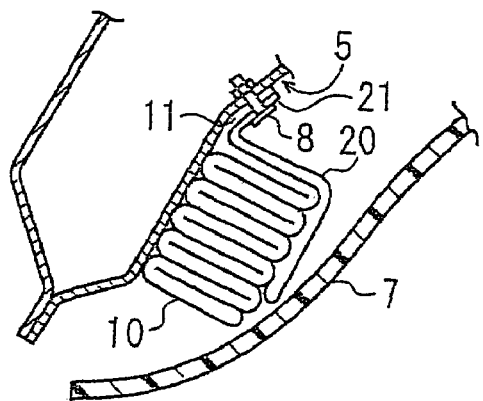
FIG. 2 is a cross-sectional view taken along line 2-2 in FIG. 1.
Figure 3:
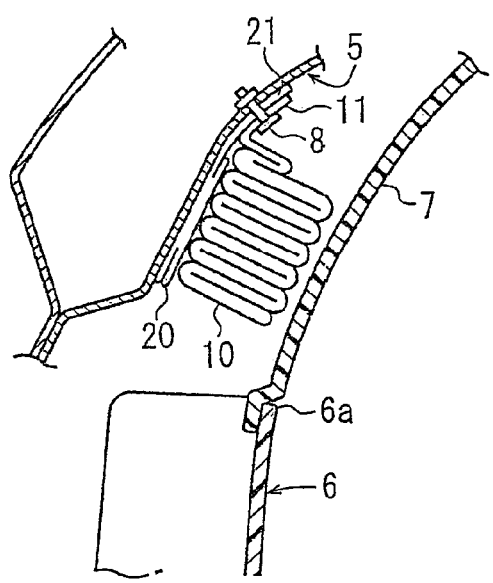
FIG. 3 is a cross-sectional view taken along line 3-3 in FIG. 1.
Figure 4:
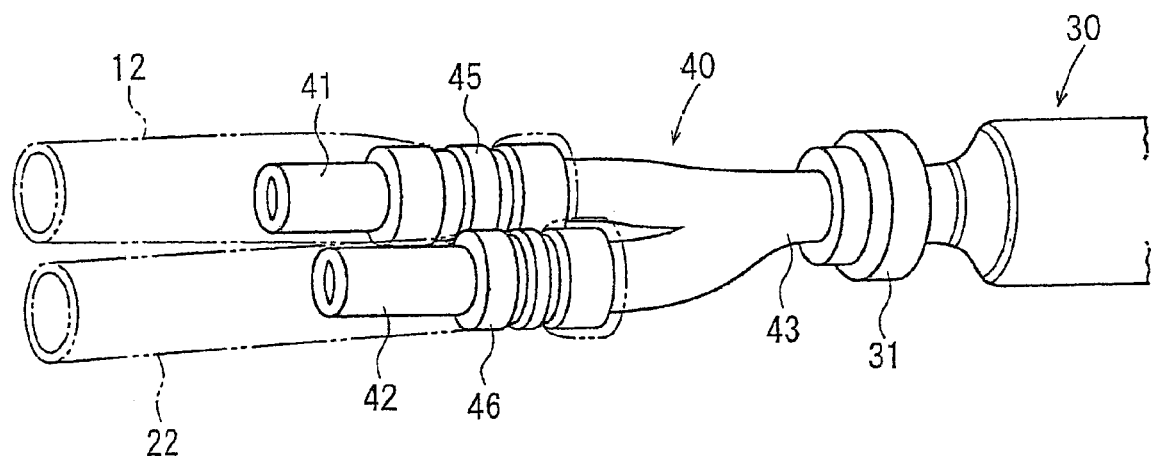
FIG. 4 is a perspective view of a connection between airbags and an inflator.
Figure 5:
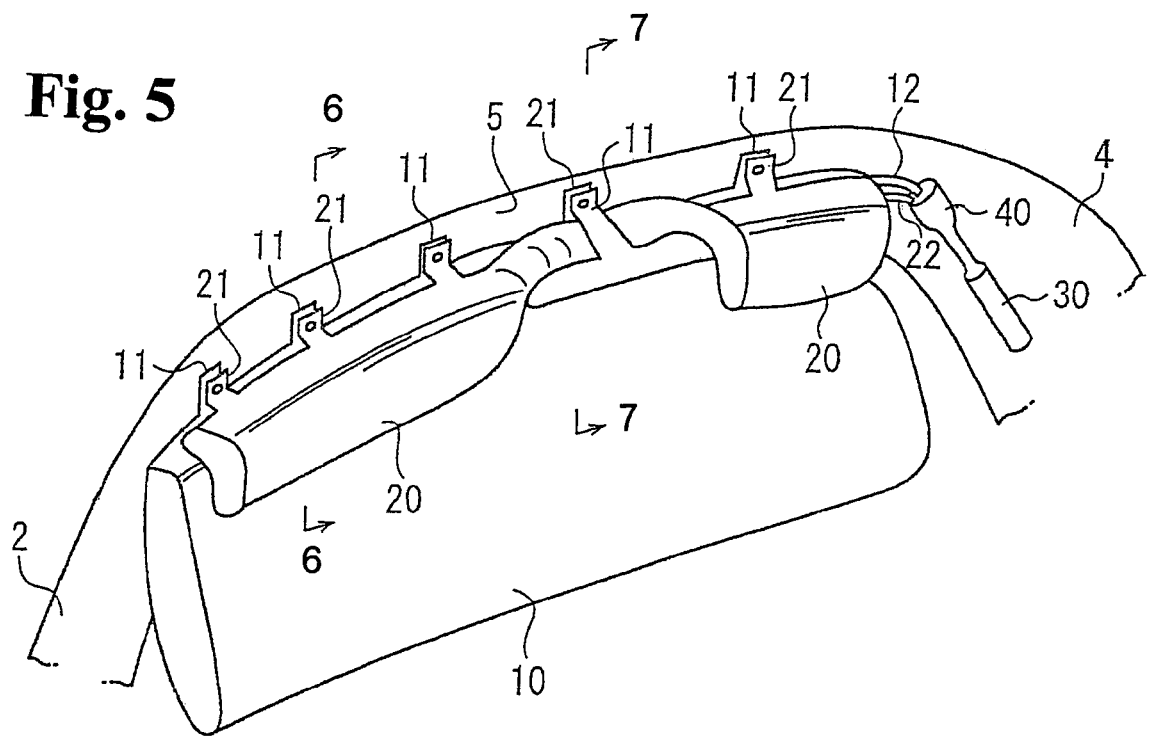
FIG. 5 is a perspective view showing a part same as that shown in FIG. 1 when the airbags are inflated.
Figure 6:
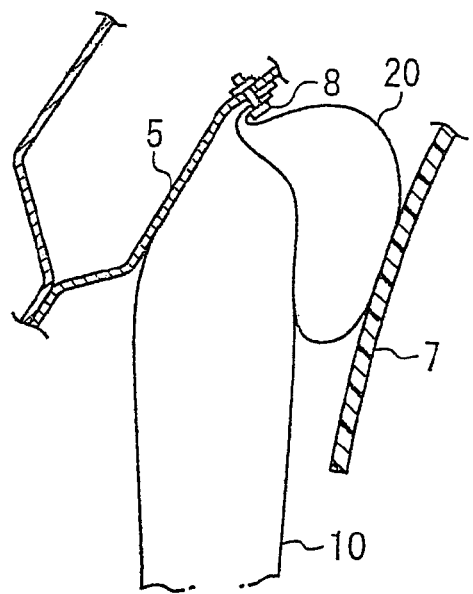
FIG. 6 is a cross-sectional view taken along line 6-6 in FIG. 5.
Figure 7:
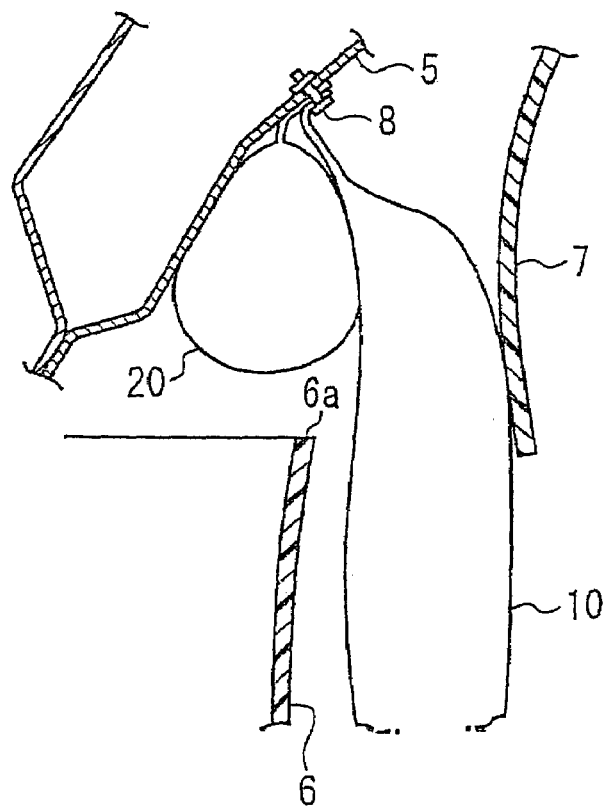
FIG. 7 is a cross-sectional view taken along line 7-7 in FIG. 5.

FIG. 1 is a perspective view inside a vehicle including a curtain airbag device according to an embodiment; FIGS. 2 and 3 are cross-sectional views taken along lines 2-2 and 3-3, respectively, in FIG. 1; FIG. 4 is a perspective view around a connection between an inflator and airbags; FIG. 5 is a perspective view inside the vehicle when the airbags are inflated; and FIGS. 6 and 7 are cross-sectional views taken along lines 6-6 and 7-7 in FIG. 5, respectively. In the description below, front and back correspond to front and rear of a vehicle.

With reference to FIG. 1, a vehicle including a curtain airbag device has an A pillar 2; a B pillar 3 serving as a center pillar; a C pillar 4; a roof side rail 5; and the like. A B pillar garnish 6 is attached to the B pillar 3. A roof lining 7 is provided along a roof of the vehicle.

As shown in FIGS. 1 to 3, the curtain airbag device includes a curtain airbag 10 folded in a slender shape; a guide airbag 20 disposed along the folded curtain airbag 10; an inflator 30 for inflating the airbags 10 and 20; and a gas-distributing unit 40.

The curtain airbag 10 extends from an upper portion of the A pillar 2 to that of the C pillar 4 via the roof side rail 5. A plurality of tabs 11 protrudes upwardly from an upper hem of the curtain airbag 10 with a predetermined spacing therebetween. The tabs 11 are fixed to the roof side rail 5 by fastenings 8 such as bolts and rivets. A gas inlet 12 extends from a rear portion of the curtain airbag 10, and is connected to a first gas outlet 41 of the gas-distributing unit 40. A size of the inflated curtain airbag 10 is large enough to cover substantially an entire window opening of a side door ranging from the vicinity of the A pillar 2 to the vicinity of the C pillar 4.

As shown in FIG. 3, the folded curtain airbag 10 is disposed above the B pillar garnish 6. When the folded curtain airbag 10 is projected downwardly, at least a part of the folded curtain airbag 10 is disposed closer to the B pillar 3 than an end 6a of the B pillar garnish 6 facing the cabin.

The guide airbag 20 extends from a front end to a rear end of the curtain airbag 10. The guide airbag 20 expands only along the vicinity of the upper hem of the inflated curtain airbag 10, and a volume thereof is smaller than that of the curtain airbag 10.

A plurality of tabs 21 protrudes from the upper hem of the guide airbag 20 with a predetermined spacing therebetween so as to overlap the tabs 11 of the curtain airbag 10. The tabs 21 are fixed to the roof side rail 5 by the fastenings 8 together with the tabs 11.

A gas inlet 22 extends toward a rear side from a rear portion of the guide airbag 20, and is connected to a second gas outlet 42 of the gas-distributing unit 40.

The guide airbag 20 is folded so as to form a slender strip, disposed along the folded curtain airbag 10, and integrated with the folded curtain airbag 10 by binding tools such as tapes (not shown). The binding tools can easily be torn when the airbags 10 and 20 are inflated.

As shown in FIG. 2, the front and rear portions of the strip-shaped guide airbag 20 are disposed so as to cover a top and a side of the folded curtain airbag 10 facing the cabin. As shown in FIG. 3, a portion of the folded guide airbag 20 substantially in the middle position in a front-back direction of the vehicle body is disposed between the folded curtain airbag 10 and the roof side rail 5. The middle position in the front-back direction of the vehicle body substantially corresponds to the upper area of the B pillar 3.

As shown in FIGS. 2 and 3, the folded airbags 10 and 20 are covered with the roof lining 7.

The gas-distributing unit 40 includes the gas outlets 41 and 42 at the front side, and a gas outlet 43 at the rear side. The gas outlet 43 is connected to the inflator 30 via an adaptor 31. The gas inlet 12 of the curtain airbag 10 and the gas inlet 22 of the guide airbag 20 are fitted onto the gas outlets 41 and 42, respectively, and tied by bands 45 and 46. The gas-distributing unit 40 and the inflator 30 are fixed to the C pillar 4.

An operation of the curtain airbag device 1 having the above-described structure will be described next. When the vehicle is involved in, for example, a side-on collision or rollover, the inflator 30 blows gas out so as to supply the gas to the airbags 10 and 20, and the airbags 10 and 20 start expanding. Since the guide airbag 20 is smaller than the curtain airbag 10, the guide airbag 20 finishes expanding faster than the curtain airbag 10, and changes the position or regulates the expanding direction of the curtain airbag 10. In the upper areas of the front door and the rear door, the guide airbag 20 is inflated between the curtain airbag 10 and the roof lining 7. As a result, the roof lining 7 is pushed open, and the curtain airbag 10 expands downwardly with the guide airbag 20.

In the upper area of the B pillar 3, the guide airbag 20 expands between the curtain airbag 10 and the roof side rail 5 so as to push the roof lining 7 open and displace the curtain airbag 10 toward the cabin over the upper area of the end 6a of the B pillar garnish 6 facing the cabin. As a result, as shown in FIG. 7, the curtain airbag 10 expands downwardly along the B pillar garnish 6 without interference of the B pillar garnish 6. In this manner, the entire curtain airbag 10 expands downwardly smoothly. In the upper area of the B pillar garnish 6, the guide airbag 20 may have a structure that expands both under the curtain airbag 10 and adjacent to the roof side rail 5. In this embodiment, the airbags 10 and 20 are inflated by a common inflator 30, thereby reducing cost and weight.

Another embodiment will be described with reference to FIGS. 8 and 9. In this embodiment, a guide airbag 20A is disposed only above the B pillar garnish 6. A tab 21A of the guide airbag 20A extends between the folded curtain airbag 10 and the roof side rail 5. A gas inlet of the guide airbag 20A extends toward the rear side and is connected to the gas-distributing unit 40 (not shown in FIGS. 8 and 9). Structures other than these components are the same as in the above-described embodiment.

In this embodiment, when the inflator starts operating, the guide airbag 20A finishes expanding faster than the curtain airbag 10. In the upper area of the B pillar garnish 6, the guide airbag 20A expands under the curtain airbag 10. Therefore, the curtain airbag 10 is pushed by the guide airbag 20A so as to move toward the cabin over the end 6a of the B pillar garnish 6 facing the cabin, and thus expands downwardly smoothly without the interference of the B pillar garnish 6.

Figure 8:
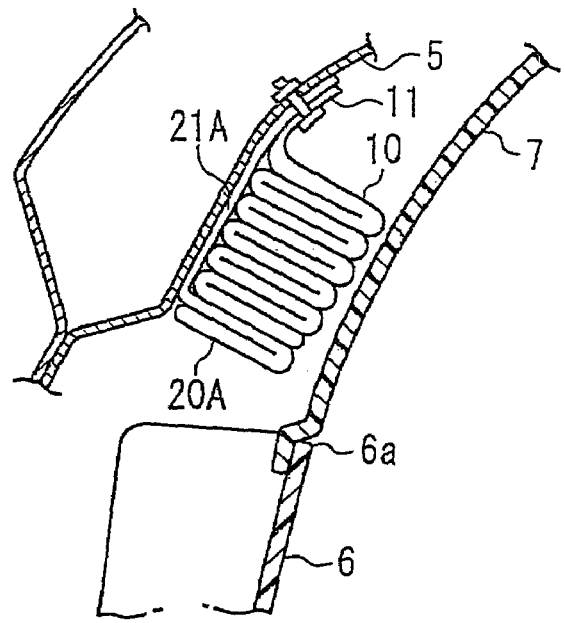
FIG. 8 is a cross-sectional view according to another embodiment of the present invention.
Figure 9:
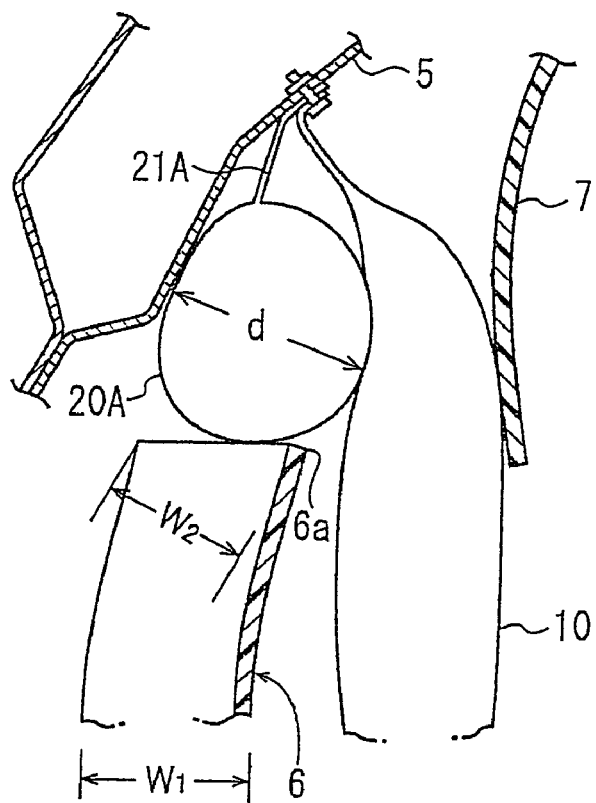
FIG. 9 is a cross-sectional view when airbags shown in FIG. 8 are inflated.

In the embodiment shown in FIGS. 8 and 9, the guide airbag 20A is disposed only above the B pillar garnish 6. The guide airbag may be disposed so as to cover the top and the side facing the cabin of the curtain airbag 10 in the upper areas of the front door and the rear door as shown in FIG. 1.

In the embodiment shown in FIGS. 8 and 9, the guide airbag 20A expands under the curtain airbag 10. The guide airbag may expand adjacent to the roof side rail 5, or expand both under the curtain airbag and adjacent to the roof side rail 5.

In the above-described embodiments, the curtain airbag 10 is displaced toward the cabin over the B pillar garnish 6 in the upper area of the B pillar garnish 6. To do so, a diameter d of the inflated guide airbag 20 or 20A above the B pillar garnish 6 is desirably larger than a width W1 of the B pillar garnish 6 in the left-right direction of the vehicle body. When the diameter d is larger than a width W2 defined by projecting the width W1 in a direction perpendicular to the side surface of the roof side rail 5 facing the cabin, the interference between the curtain airbag 10 and the B pillar garnish 6 is reliably prevented.

A conventional jump base is not required in any of the above-described embodiments, and the common curtain airbag device can be attached to a vehicle regardless of a size thereof or a size and a shape of the B pillar garnish.

Figure 10:
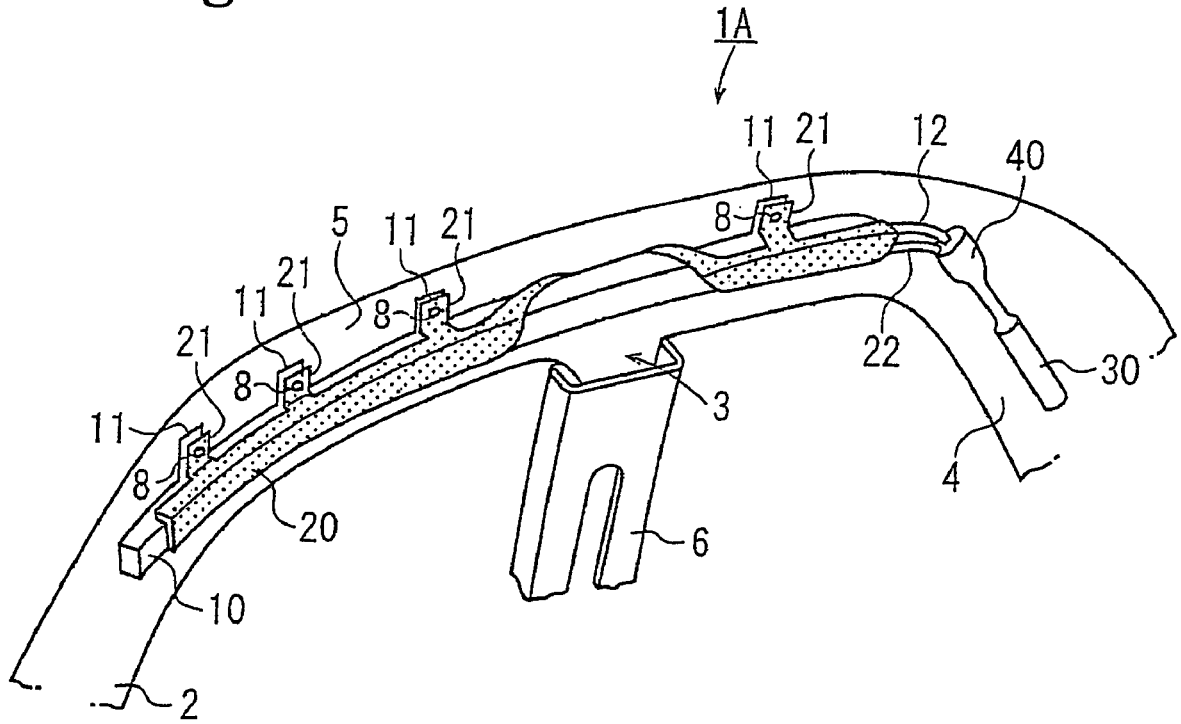
FIG. 10 is a perspective view inside a vehicle including a curtain airbag device according to a further embodiment of the present invention.

FIG. 10 is a perspective view inside a vehicle including a curtain airbag device 1A according to a further embodiment. In the curtain airbag device 1A, the folded curtain airbag 10 extends from the upper portion of the A pillar 2 to that of the C pillar 4 along the roof side rail 5. In addition, the guide airbag 20 folded so as to form a strip shape extends from the front end to the rear end of the folded curtain airbag 10. In this embodiment, the plurality of tabs 11 and 21 protrudes from the upper hems of the curtain airbag 10 and the guide airbag 20, respectively, with a spacing therebetween in the front-back direction of the vehicle body. The tabs 11 and 21 are fixed together to the roof side rail 5 by the fastenings 8 such as bolts and rivets.

In this embodiment, the tabs 11 and 21 are not provided at the upper hems of the curtain airbag 10 and the guide airbag 20 substantially in the middle position in the front-back direction of the vehicle body. Thus, the curtain airbag 10 and the guide airbag 20 are not connected to the roof side rail 5 substantially in the middle position in the front-back direction of the vehicle body. The middle position in the front-back direction of the vehicle body substantially corresponds to the upper area of the B pillar 3.

In this embodiment, the front and rear portions of the guide airbag 20 are disposed so as to cover the top and the side facing the cabin of the folded curtain airbag 10, and the portion in the upper area of the B pillar 3 is disposed between the folded curtain airbag 10 and the roof side rail 5.

The guide airbag 20 may be disposed under the folded curtain airbag 10. Moreover, the guide airbag 20 may be disposed between the folded curtain airbag 10 and the roof side rail 5, and under the folded curtain airbag 10.

Structures other than the curtain airbag device 1A are the same as in the above-described curtain airbag device 1 shown in FIGS. 1 to 7, and components having the same reference numerals or symbols correspond to the same components.

When the curtain airbag device 1A having the above-described structure is shipped from a manufacturing facility, the folded guide airbag 20 and the folded curtain airbag 10 are integrated together by the binding tools such as tapes in advance. First, the folded guide airbag 20 is disposed so as to cover the top and the side facing the cabin over the entire length, when the folded curtain airbag 10 is attached to the vehicle body. The front ends and the rear ends of both airbags are integrated together by the binding tools such as tapes. Next, the middle portion of the guide airbag 20 is twisted so as to be disposed along a side adjacent to the roof side rail, when the folded curtain airbag 10 is attached to the vehicle body. The middle portions of both airbags are integrated together by the binding tools such as tapes.

When the integrated structure of the folded guide airbag 20 and the folded curtain airbag 10 are attached to the vehicle body, the integrated structure is disposed along the roof side rail 5, and the front and rear ends thereof are fixed to the roof side rail 5 by the fastenings 8 via the tabs 11 and 21.

In this manner, according to this embodiment, the curtain airbag 10 and the guide airbag 20 can be easily attached to the roof side rail 5 only by fixing the front ends and the rear ends of both airbags.

According, to the curtain airbag device 1A, the middle portions of the curtain airbag 10 and the guide airbag 20 in the front-back direction of the vehicle body are not connected to the roof side rail 5. Therefore, the middle portion of the guide airbag 20 in the front-back direction of the vehicle body may be tucked between the folded curtain airbag 10 and the roof side rail 5 after fixing the front ends and the rear ends of the curtain airbag 10 and the guide airbag 20.

According to the curtain airbag device 1A, the curtain airbag 10 is not connected to the roof side rail 5 in the upper area of the B pillar 3. Accordingly, when the guide airbag 20 is inflated between the curtain airbag 10 and the roof side rail 5, the curtain airbag 10 is pushed by the guide airbag 20 and moves smoothly and quickly toward the cabin. As a result, the interference of the B pillar garnish 6 with the curtain airbag 10 is reliably prevented.

The above-described embodiments are merely examples for carrying out the present invention, and embodiments other than those shown in the drawings are permissible within the scope of the present invention. For example, the curtain airbag and the guide airbag may be inflated by separate inflators. Moreover, the inflator may be disposed at a predetermined position of the roof side rail or on the A pillar.

In the present invention, the center pillar refers to a pillar disposed between a front pillar at the forefront in the front-back direction of the vehicle body and a rear pillar at the rearmost position. In the above-described embodiments, the vehicle body includes three pillars, the A pillar, the B pillar, and the C pillar, from the front to the rear, and only the B pillar corresponds to the center pillar. When a vehicle body includes four pillars, an A pillar, a B pillar, a C pillar, and a D pillar, the B pillar and the C pillar correspond to the center pillars.

The disclosure of Japanese Patent Application No. 2004-273613, filed on Sep. 21, 2004, is incorporated in the application.

While the invention has been explained with reference to the specific embodiments of the invention, the explanation is illustrative and the invention is limited only by the appended claims.

What is claimed is:

1. A combination comprising a curtain airbag device, and a vehicle, wherein said curtain airbag device comprises a curtain airbag disposed along a side surface of the vehicle facing a cabin in a folded state and capable of expanding downwardly along the side surface; an inflator for inflating the curtain airbag; and a guide airbag situated adjacent to and formed independently and separately from the curtain airbag for regulating the curtain airbag to expand in a predetermined direction, said guide airbag expanding substantially at the same time when the curtain airbag expands, and a part of said guide airbag is disposed between the side surface of the vehicle and the curtain airbag in an upper area of a center pillar, and a remaining part of the guide airbag is disposed on a side of the curtain airbag facing the cabin in an upper area of a side door or a window.

2. A combination according to claim 1, wherein said guide airbag guides the curtain airbag toward the cabin.

3. A combination according to claim 1, wherein said guide airbag pushes the curtain airbag laterally inwardly or outwardly relative to a direction that the curtain airbag is disposed.

4. A combination according to claim 1, wherein said guide airbag has a volume smaller than that of the curtain airbag when the guide airbag and the curtain airbag are fully inflated, respectively.

5. A combination according to claim 1, wherein said inflator is connected to the guide airbag and the curtain airbag for supplying gas to both separately.

6. A combination according to claim 1, wherein said guide airbag expands so as to guide the curtain airbag toward the cabin over an upper end of a center pillar garnish facing the cabin.

\* \* \* \* \*